Figure 1:
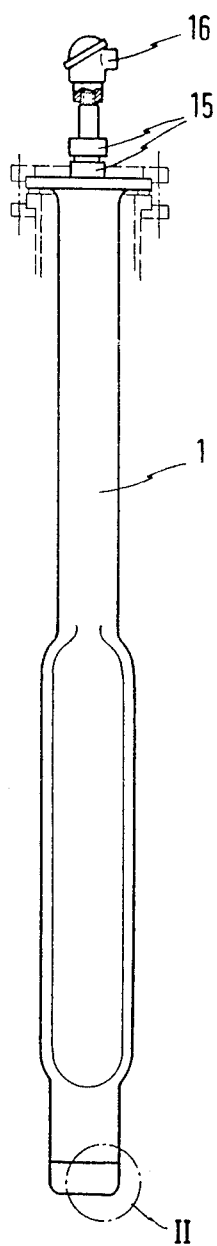

United States Patent [19]

Schertz et al.

[11] Patent Number: 4,979,831
[45] Date of Patent: Dec. 25, 1990

[54] TEMPERATURE MEASURING SENSOR ARRANGEMENT

[75] Inventors: Reinhart Schertz; Rainer Trampert; Karl Weissmann, all of Oftersheim, Fed. Rep. of Germany

[73] Assignee: Pfaudler-Werke AG, Schwetzingen, Fed. Rep. of Germany

[21] Appl. No.: 358,701

[22] Filed: May 26, 1989

[30] Foreign Application Priority Data

Jun. 3, 1988 [DE] Fed. Rep. of Germany ....... 3818957

[51] Int. Cl.⁵ .............................................. G01K 1/08
[52] U.S. Cl. ..................................... 374/158; 374/208
[58] Field of Search ....................... 136/230, 232, 233; 338/28, 29; 374/158, 208, 210, 139

[56] References Cited

U.S. PATENT DOCUMENTS

| | | | |
|---|---|---|---|
| 2,839,594 | 6/1958 | Schneidersmann | 136/4 |
| 3,738,173 | 6/1973 | Sato | 374/158 |
| 4,558,959 | 12/1985 | Thomas | 374/141 |
| 4,614,443 | 9/1986 | Hamert | 374/163 |
| 4,822,570 | 4/1989 | Lerman et al. | 422/119 |

FOREIGN PATENT DOCUMENTS

| | | | |
|---|---|---|---|
| 0191112 | 9/1984 | European Pat. Off. | 374/163 |
| 2518747 | 12/1981 | France . | |
| 2535048 | 10/1983 | France . | |
| 2555313 | 11/1983 | France . | |
| 1334550 | 10/1973 | United Kingdom | 374/208 |

Primary Examiner—William A. Cuchlinski, Jr.
Assistant Examiner—W. Morris Worth
Attorney, Agent, or Firm—Michael L. Dunn; Robert P. Simpson

[57] ABSTRACT

A temperature measuring sensor arrangement is described, which can be inserted into or removed from an enamelled built in part in a simple manner without a need for specific tools. A measuring insert with a carrier is provided, along the length of which an outwardly protruding detent element in the form of a collar is provided, and from the lower end surface of which carrier one or several measuring sensors are protruding. The carrier is slidably arranged in a longitudinal direction in a guiding tube and is biased downwardly by a spring engaging between the detent element and a shoulder in the guiding tube. A stop protruding from the inner wall of the guiding tube limits the displacement of the biased carrier. The guiding tube is fixedly mounted at the upper end protruding from the guilt in part by means of a wedge ring-screwed joint in the inserted position, in which the detent element is raised from the stop and the ends of the measuring sensors are pressed against a surface formed at the enamelled built in part over a thin walled bottom region. The bottom region is provided with an upwardly extending conical enlargement for the insert end of the guiding tube. Preferably the thin walled bottom region is provided with a coating out of silver.

7 Claims, 2 Drawing Sheets

TEMPERATURE MEASURING SENSOR ARRANGEMENT

The invention is related to a temperature measuring sensor arrangement insertable into and removable from an enamelled built in part.

A known sensor arrangement of this type, which can be inserted into or removed from an enamelled thermometer tube or an enamelled baffle is provided with a measuring insert (EP 0 191 112-A1) comprising a sleeve, in which a measuring head is arranged with a radial clearance. The measuring head is movable in a longitudinal direction and biased by a spring against a bottom region of the built in part, which bottom region is formed relatively thin. A cylindrical socket is welded to the border of the bottom region, forming with fingers protruding from the sleeve a bayonet joint. It is possible in combination with another bayonet joint to insert or remove the measuring insert if a proper rotational movement is effected. The inner side of the thin bottom region may be treated with a corrosion resisting medium. At the head of the measuring insert several sensors in the form of resistance thermometers or thermoelements can be built in into an insulating mass out of foamed glass.

It is the object of the invention to improve a temperature sensor arrangement of this type in such a manner, that a simple and cost saving construction can be used, allowing insertion into and removal from the respective built in part in a reliable manner but with a minimized expenditure of work. It is also an object of the invention to achieve a reliable operation with a rather high speed of response of the sensors.

In accordance with the invention this problem is solved by the subject of claim 1. Advantageous improvements and embodiments are subject of the subclaims.

Specific advantages of such a measuring sensor arrangement are to be seen in the fact, that tools like bayonet joints are not needed, so that the construction and the work necessary for mounting can be simplified. Furthermore, since the ends of the sensors which are pressed against the thin walled bottom region protrude downwardly over an insulating mass out of cement, epoxy resin etc. serving for insulating and securing purposes, a very quick response of the sensors is possible.

Figure 2:
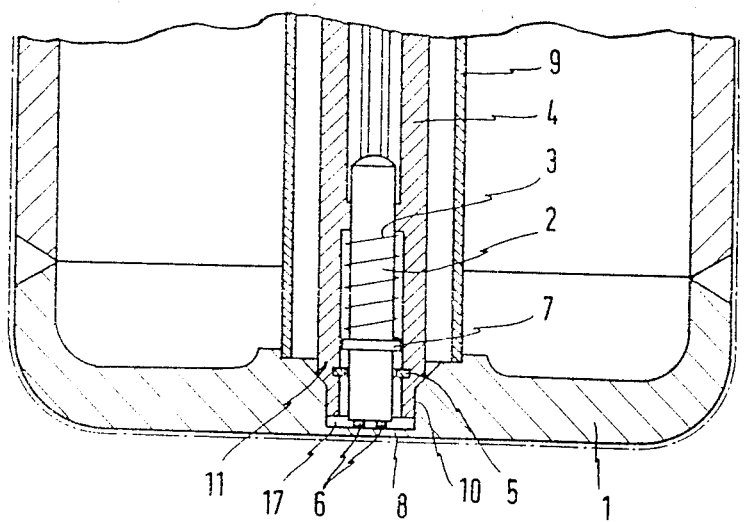
Figure 3:
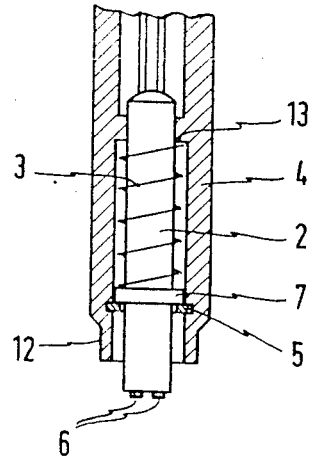
Figure 4:
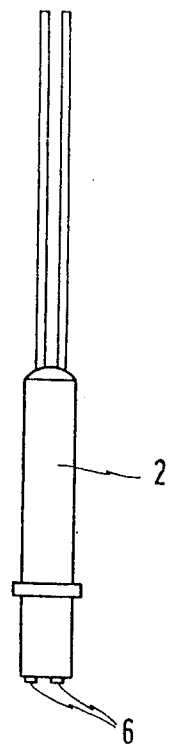

With reference to the drawings embodiments of the invention shall be described in a more detailed manner:

FIG. 1 shows a view of an enamelled baffle, into the inner space of which a sensor arrangement in accordance with the invention is built in, FIG. 2 shows a sectional view of the lower end of the baffle in FIG. 1, in which the sensors are arranged, FIG. 3 shows a sectional view of the measuring insert in FIG. 2 in a premounted condition, and FIG. 4 shows a view of the carrier in FIGS. 2 and 3, at which conduits are provided leading to the terminal head in FIG. 1.

FIG. 1 shows an enamelled baffle 1, which may be inserted as a built in part e.g. into an enamelled agitator vessel. Of the measuring sensor arrangement only the terminal head 16 is shown, as well as a screw joint 15 comprising a wedge ring. This joint serves for sealing the inner space of the baffle against the atmosphere.

FIG. 2 shows a measuring sensor arrangement in accordance with the invention, in which the measuring insert is shown in the inserted condition. The measuring insert comprises an elongated carrier 2, along the length of which an outwardly protruding detent element 7 in the form of a collar is provided. From the lower surface of the carrier 2 two measuring sensors 6 are protruding in the shown embodiment. Normally one to four measuring sensors are provided, the number of the measuring sensors depending on the measuring functions to be performed.

The carrier 2 is slidably arranged in a longitudinal direction in a guiding tube 4, the upper end of which protrudes from the built in part 1 in FIG. 1 and is fixed in the inserted position by the sealing screwed joint 15 with a wedge ring. In the guiding tube 4 a shoulder 13 is formed. Between the shoulder 13 and the detent element 7 a spring 3 is inserted, which presses the detent element 7 in the premounted position against a stop 5, which can be e.g. a snap ring inserted into a groove in the inner wall of the guiding tube 4. The mounted position is shown in FIG. 2, in which the detent element 7 is raised from the stop 5. Preferably between the carrier 2, which is slidable in the longitudinal direction, and the inner wall of the guiding tube 4 a radial clearance is provided, in order that the carrier 2 can be tilted if necessary into the position, in which the contact surfaces of the downwardly protruding ends of the one or of the several measuring sensors 6 are securely pressed against a thin walled bottom region 8. The thin walled bottom region 8 which may have a thickness of e.g. 3 mm is preferably provided with a coating 17 out of silver. The coating out of silver can be provided in such a manner, that e.g. a wafer out of silver having a thickness of 1 mm is soldered with a high temperature solder. Since the coating out of silver is formed before enamelling, scaling of the steel at the relatively high firing temperatures is avoided, which are necessary for enamelling. Furthermore, it is assured by the silver coating, that after some operation time no corrosion layer is formed which would diminish the heat transfer. In comparison to other corrosion resistant layers the use of silver having a high thermal conductivity provides for a higher response speed of the measuring sensors.

The coating 17 out of silver is provided above the lower end of an insert bore 10, which is formed in the cap of the enamelled built in part 1. The insert bore 10 is provided at the upper end with a conical enlargement 11 for the insert end 12 of the guiding tube, which insert end is preferably shaped correspondingly. The conically enlarging insert bore for the insert end 12 makes it possible, that the insert end can be seated into the insert bore 10 in an easy manner during mounting.

For a further simplification of mounting it is advantageous to weld a mounting tube 9 to the enamelled built in part 1, which mounting tube surrounds the guiding tube 4.

During mounting insert end 12 of guiding tube 4 comes into the position as shown in FIG. 2 by pressing it downwardly, whereafter the screwed joint 15 shown in FIG. 1 is tightened, so that the shown position is maintained.

The leads for the measuring sensors 6 as shown in FIG. 4 may have a length of e.g. 4000 mm corresponding to the length of the built in part. Such leads are protected along their complete length by the guiding tube 4 to prevent damage to the leads during mounting.

What is claimed is:

1. A temperature measuring probe assembly for measuring the temperature of a substance within an enamelled vessel, comprising:

a temperature sensing probe having at least one temperature sensor;

an enamelled housing having a partial through-bore for holding said probe, said partial through-bore having an upper end with a conical enlargement and forming a thin-walled bottom portion in said housing for heat transfer from the substance within the vessel and external to the housing to said sensor which is in contact with an interior surface of the bottom portion of the housing;

a one-piece guide tube for holding said sensing probe, said guide tube having a lower end which is conically shaped to mate with said conical enlargement of said housing and to facilitate alignment of said guide tube within said housing during assembly;

means for biasing said temperature probe to place said sensor in contact with said interior surface of the bottom portion and for retaining said probe within said guide tube when said guide tube is being removed from or inserted into said housing; and means for inserting and removing said guide tube into and out of said housing, respectively.

2. A temperature measuring probe assembly as recited in claim 1 wherein a radial clearance is provided between an inner wall of the guide tube and the sensing probe.

3. A temperature measuring probe assembly as recited in claim 1 wherein the interior surface of said thin-walled bottom portion is coated with a layer of silver.

4. A temperature measuring probe assembly as recited in claim 1 wherein said temperature sensor is fixed to an end of said sensing probe by means of an insulating cement.

5. A temperature measuring probe assembly as recited in claim 1 wherein said temperature sensor is a resistance thermometer.

6. A temperature measuring probe assembly as recited in claim 1 wherein said temperature sensor is a thermoelement.

7. A temperature measuring probe assembly as recited in claim 1 wherein said means for inserting and removing said guide tube includes a screw joint and wedge ring for sealing the interior of said guide tube from the atmosphere.

* * * * *

UNITED STATES PATENT AND TRADEMARK OFFICE
CERTIFICATE OF CORRECTION

PATENT NO. : 4,979,831
DATED : December 25, 1990
INVENTOR(S) : Reinhart Schertz et al.

It is certified that error appears in the above-identified patent and that said Letters Patent is hereby corrected as shown below:

Cover page, ABSTRACT, line 15, "guilt" should read "built".

Sheet 1 of 2, FIG. 1, the roman numeral "II" should read "FIG. 2".

Signed and Sealed this

Twelfth Day of May, 1992

Attest:

DOUGLAS B. COMER

Attesting Officer

Acting Commissioner of Patents and Trademarks